Feb. 21, 1939.   B. O'BRIEN   2,147,857
METHOD OF IRRADIATING LIQUIDS
Filed Feb. 1, 1933   6 Sheets-Sheet 1

Inventor
Brian O'Brien
By Popp and Powers
Attorneys

Feb. 21, 1939. B. O'BRIEN 2,147,857
METHOD OF IRRADIATING LIQUIDS
Filed Feb. 1, 1933 6 Sheets-Sheet 2

Inventor
Brian O'Brien
By Popp and Powers
Attorneys

Feb. 21, 1939.  B. O'BRIEN  2,147,857
METHOD OF IRRADIATING LIQUIDS
Filed Feb. 1, 1933  6 Sheets-Sheet 3

Inventor
Brian O'Brien
By Popp and Powers
Attorneys

Fig. 14.

Feb. 21, 1939.   B. O'BRIEN   2,147,857
METHOD OF IRRADIATING LIQUIDS
Filed Feb. 1, 1933   6 Sheets-Sheet 6

Inventor
Brian O'Brien
By
Popp and Powers
Attorneys

Patented Feb. 21, 1939

2,147,857

UNITED STATES PATENT OFFICE 2,147,857

METHOD OF IRRADIATING LIQUIDS

Brian O'Brien, Rochester, N. Y.

Application February 1, 1933, Serial No. 654,649

14 Claims. (Cl. 99—218)

This invention relates to a method of and apparatus for irradiating liquids of a more or less opaque character such as, for example, milk, serums, wines, oils and medicines. By way of example, the invention is illustrated in connection with the irradiation of milk with ultra violet light.

Owing to the actinic and bactericidal powers of ultra violet light various methods have been proposed, heretofore, which involve its use in connection with the treatment of milk to destroy bacteria and increase the antirachitic potency. Such methods have had the objection that the vitamin A content is substantially reduced as an incident to the production of the desired vitamin D content. Coagulation of the protein content and the impairment of the taste of the milk together with the above objection have offset to a substantial degree the advantages resulting from the practice of such processes.

One object of the present invention is to overcome the above objections, this object contemplating a process by which the liquid is so treated that certain constituents thereof may be activated to the extent desired without injury or impairment of the remaining constituents.

A further object is to provide a process which is effective to treat the various constituents of the liquid throughout the entire body of the liquid.

A still further object is to provide a process by which injurious oxidation of the liquid during irradiation thereof is prevented.

A still further object is to provide apparatus for carrying out the above process, this object contemplating apparatus through which the liquid to be treated is caused to flow continuously in a stream of substantially uniform depth with the freely exposed surface thereof directed toward the light source.

A still further object is to provide means for preventing the formation in the flowing stream of ridges, wrinkles or other wave-like irregularities which reduce the effectiveness of the process.

A still further object is apparatus in which provision is made for preventing separation of the liquid into independent streams.

A still further object is to provide a novel design of apparatus, whereby to facilitate filtering of the light emitted from the light source to eliminate light of an undesirable wave length.

A still further object is apparatus in which provision is made for preventing the accumulation upon the walls of the apparatus of solid matter emitted from the light source.

Apparatus for carrying out the process is illustrated in the accompanying drawings, in which.

Any desired type of apparatus may be employed in carrying out my process. The apparatus illustrated includes a cylindrical glass shell 10, it being understood that the shell may, if desired, be of metal or any other suitable material. The shell is suitably secured between opposing heads 19 and 20 by the rods 21. The inner wall 11 of the shell is adapted to provide a surface over which the liquid to be treated is caused to flow in a continuous film of substantially uniform depth. The film may be created and maintained in any convenient manner. To this end a ring 12 is suitably secured in the upper end of the glass shell 10. The said ring is serrated around its lower edge as at 13, the serrations providing small passages between the ring and the adjacent wall of the shell. The size of the serrations is determined by the thickness of film desired and hence it is preferred that the ring 12 be either adjustable or removable so that the thickness of the film may be regulated as occasion demands.

The liquid to be treated is delivered to the apparatus by supply pipes 14 which enter the upper end of the shell 10 from opposite sides. Each pipe is formed with a depending end 14a which is curved to follow the inner wall of the shell. The said ends are suitably perforated so that the liquid is discharged against the wall 11 above the ring 12. As the liquid passes through the serrations 13 of the ring the small streams formed thereby fan out and merge with the adjacent streams a short distance below the ring 12 thereby forming a thin smooth film of uniform thickness over the entire wall. From the bottom of the wall 11 the liquid is conducted to a point of disposal by a suitable pipe 14b.

The thickness of the film which is flowing down the wall 11 is determined by various factors. As will be more fully explained hereinafter, the film is preferably maintained at a thickness between 0.02 cm. and 0.03 cm. when the liquid being treated is milk. Precautions must be taken when the film is of a thickness of this order to prevent the formation of ridges, wrinkles and other forms of irregularities, whereby to insure uniform treatment of the liquid. The most common forms of irregularities are the breaking of the film lengthwise of the path of flow into rivulets with dry areas of wall surface between and, in the case of liquids of low viscosity and high surface tension such as water, the formation of wrinkles or ridges in the film, the wrinkles extending transversely of the path of flow. In the former instance, the liquid at the surface of the rivulets travels at a much greater speed than the liquid beneath it and in the latter instance the liquid in the wrinkles travels faster than the liquid between them.

Figures 8, 9:
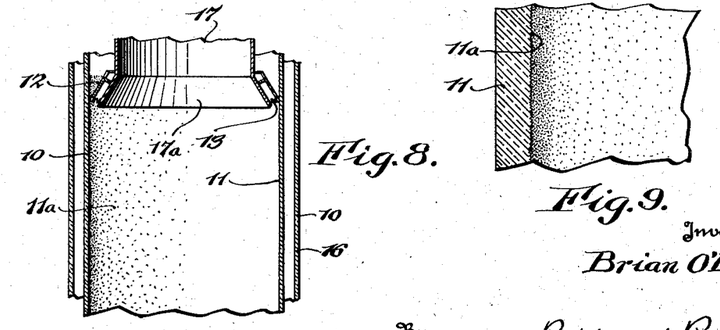
Figure 8 is a view similar to Figure 6 of an embodiment in which means is provided for maintaining the stability of the liquid film.
Figure 9 is an enlarged sectional view of a portion of the wall shown in Figure 8.

The first mentioned irregularity, that is to say, the formation of rivulets tends to occur with all liquids but is more pronounced in those having a high surface tension and for flow over solid wall surfaces which are not easily wet by the liquid (that is where the contact angle between the liquid and the wall surface is far from zero). This is the case for most watery liquids flowing over a metal surface. For oily liquids flowing over metal surfaces and for most watery liquids flowing over a surface such as glass or porcelain, however, the contact angle approaches zero if the surface be free from oil or grease and a stable flow can quite readily be maintained (assuming that there are no substantial differences in temperature between adjacent portions of the surface parallel to the flow). The stability of the film may be further augmented by forming the wall 11 (Figures 8 and 9) with a roughened or finely ground surface 11a of a grain fine as compared to the thickness of film to be employed. The precise reason for the result obtained is not apparent, although it is associated in some manner with the increase of surface (one square inch of wall actually possessing several square inches of surface) and with the breaking up of the surface into many sharp angular projections.

Figure 5:
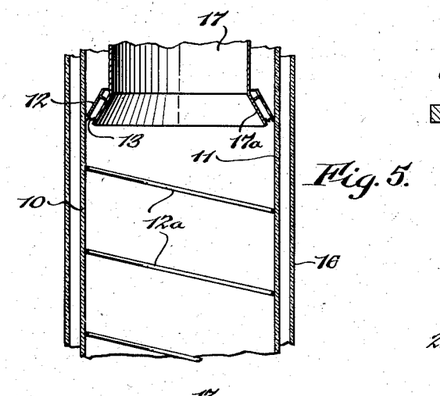
Figures 5 and 6 are fragmentary sections of modified forms of the apparatus in which provision is made for preventing the formation of ridges, wrinkles or other wave-like irregularities in the liquid as it flows past the light source.
Figure 6:
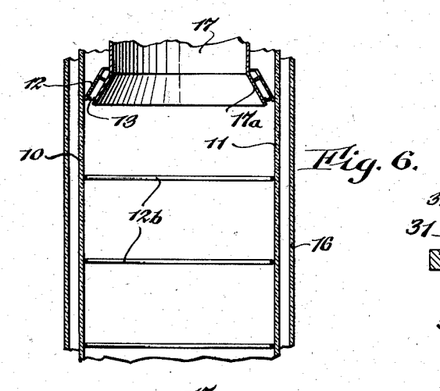

The second mentioned form of film instability, i. e. the formation of ridges in the film transversely of the path of flow, cannot be prevented by a roughened surface. A ridge once formed is, in effect, a thicker film, and the velocity of flow at its surface is much greater than that at the surface of the film adjacent it. The liquid in the ridge thus moves past the rest of the film unless checked in some manner. In a number of the methods employed heretofore, the liquid has been passed over a corrugated surface. While such a surface will partly prevent formation of such ridges, a smooth film of uniform depth is also prevented. I have discovered that the formation of ridges and other wave-like irregularities may be prevented by providing a series of small ledges or ribs at suitable intervals, the said ledges or ribs being arranged substantially transversely of the path of flow. The ledges, as best shown in Figure 5, may be provided by a fine wire 12a bent in a helix so as to contact with or be in close proximity to the wall 11. The ledges may be formed integrally with the wall 11 or may consist of independent rings 12b (Figure 6). The ledges present abrupt faces to the liquid which flows over them as over a dam and any tendency toward wrinkle formation is checked. The liquid receives little or no effective treatment during its passage over the ledges. However, as the distance between adjacent ledges is large relative to the size of the ledges, the total effective area of the wall is reduced only slightly. The spacing of the ledges is determined by the character of the liquid and by the thickness of the film. For instance, water flowing in a film .02 cm. in depth will travel about three inches before ridges start to form while when the film is increased to .03 cm. in thickness, the ridges start to form after less than one inch of flow.

Figure 1:
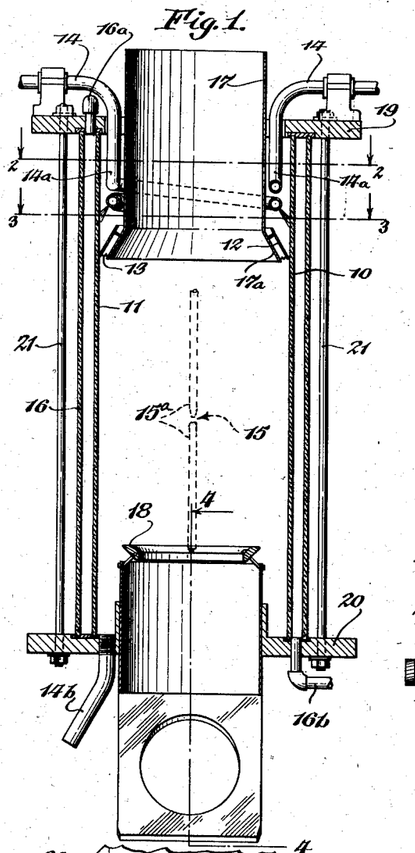
Figure 1 is a vertical section through the apparatus, the electrodes which provide the light source being indicated in dotted lines.
Figure 2:
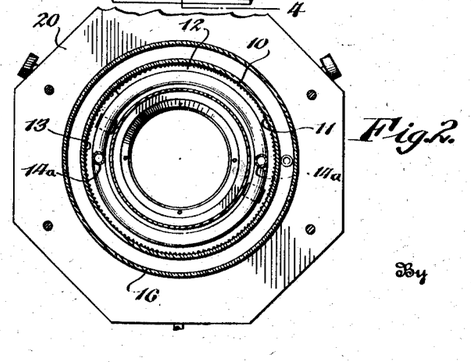
Figure 2 is a horizontal section taken along line 2—2 of Figure 1.
Figure 3:
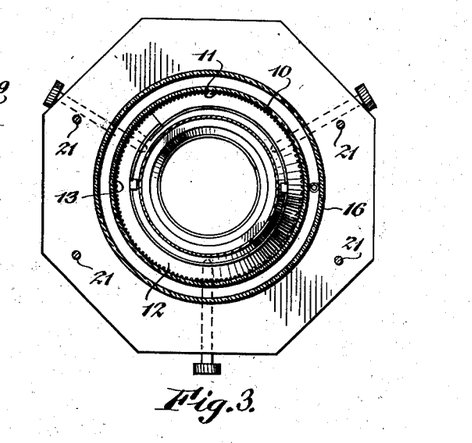
Figure 3 is a similar section taken along line 3—3 of Figure 1.
Figure 4:
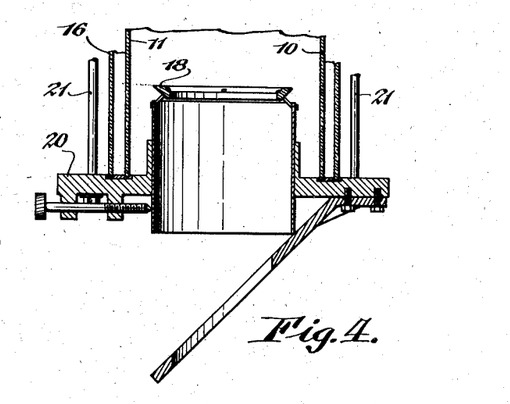
Figure 4 is a vertical section taken along line 4—4 of Figure 1.

While flowing down the wall 11, the liquid is subjected to light emitted from a source which is indicated generally at 15 (Figure 1). The light source is preferably provided by a carbon arc, the means for providing and regulating the arc being sufficiently illustrated, for present purposes, by a showing of the electrodes 15a. The electrodes are preferably so arranged that the arc which is produced is along the axis of the shell 10 substantially midway between its ends. I have discovered that radiation of a wave length between 2750 A. and 3150 A. is very effective in producing antirachitic potency. Radiation of a wave length much shorter than the minimum value given produces pronounced protein coagulation. As a mercury vapor arc produces a high intensity of light of a wave length shorter than the range indicated, this type of light source is objectionable. An arc, on the other hand, which is produced by carbon electrodes is desirable as ingredients may be incorporated in the electrodes which will result in their emitting light in the desired wave length region, i. e. between 2750 A. and 3150 A. without the emission of a large amount of light of shorter wave lengths.

In order to permit the escape of smoke and vapor emitted by the light source a vent pipe 17 is arranged over the arc and is formed with a flared end 17a which terminates a short distance from the inner surface of the wall 11. The flared end of the pipe intercepts that portion of the emitted light which, owing to the distance and the angle at which it would strike the film, is of little value. A ring 18 is arranged in the opposite end of the shell 11, the said ring serving as a periscope and being adapted to intercept those rays which are directed in the opposite direction and which are also of little value. I have found that the most practical arrangement in which a unit source is employed is one in which the extremities of the treating zone are at an angle of 60° with respect to a horizontal plane through the light source.

In the treatment of liquids requiring high intensity radiation, considerable warming of the liquid would occur if not otherwise prevented. Such warming is undesirable because if a portion of the surface of the liquid is hotter than adjacent portions, the lowered surface tension of the liquid at the hotter portion permits the adjacent cooler portions to act against it and a break occurs. In order to prevent warming of the film, therefore, it is preferred to utilize a water or brine jacket 16, the latter surrounding the shell 10 down the inner wall of which the liquid being treated is caused to flow. Circulation of the cooling medium through the jacket may be effected by suitable feed and discharge pipes 16a and 16b respectively. In order to increase the degree of heat transferred from the film through the shell to the cooling medium the said shell may, instead of being formed of glass as illustrated, be formed of metal. In this event the exposed surface of the shell may be coated with glass enamel or a similar material.

Figure 7:
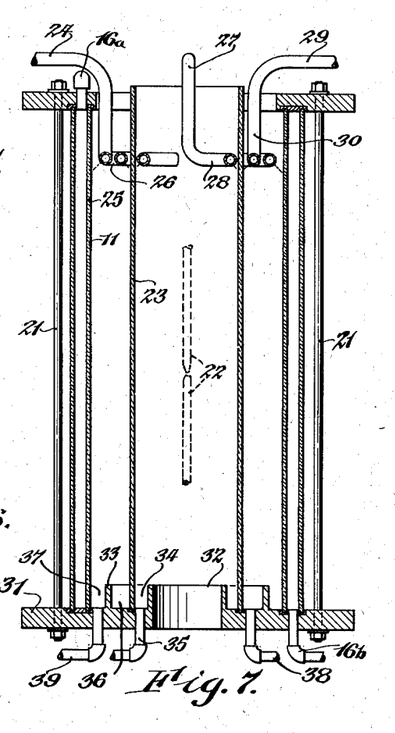
Figure 7 is a section similar to Figure 1 of another embodiment of the invention.

In the embodiment illustrated in Figure 7 the electrodes 22 which provide the light source are arranged axially of a fused quartz cylinder 23. The latter is arranged within and co-axially of the shell 11 and is supported upon the lower head 31, whereby the light which is emitted by the light source must pass through the cylinder 23. The liquid to be treated is delivered to the apparatus by a supply pipe 24. The terminal portion of the supply pipe extends into the upper end of the shell 25 and is bent in the form of a circular loop 26. The loop is formed with an annular series of perforations, whereby the liquid delivered to the supply pipe is discharged against the inner wall of the shell 25. The streams of liquid thus formed fan out and merge to provide a uniform film of the character desired.

In accordance with the invention a flowing liquid film is created and maintained on the inner wall of the cylinder 23. To this end a supply pipe 27 which is in communication with a source of liquid having the desired characteristics is extended into the upper end of the cylinder 23. The terminal portion of the said pipe is bent in the form of a circular loop 28, the latter being arranged in close proximity to the inner wall of the said cylinder. The loop 28 is formed with an annular series of perforations, whereby the liquid delivered to the pipe 27 is discharged against the inner wall of the cylinder. The liquid flows down the wall of the latter in substantially the same manner as the liquid which is to be treated flows down the inner wall of the shell 25. Even in the most efficient light sources a large per cent of the total emitted light is infra red and since infra red light of a wave length longer than 14,000 A. is readily absorbed by water and liquid solutions, it is radiation of this wave length which is largely responsible for the heating of the flowing film of liquid under light treatment.

The construction described, therefore, has the advantage that by utilizing a flowing film of water or other liquid, light of a predetermined wave length may be prevented from acting upon the liquid being treated. For example, by filtering out infra red light the temperature of the liquid being treated can be more readily maintained at the value desired. A characteristic of the carbon arc is that there is a small amount of radiation of a wave length of the order of 2200 A. and shorter. Radiation of this character is capable of producing ozone from oxygen. The use of a liquid filter, therefore, in the manner described has the further advantage that light of wave lengths of the order of 2200 A. and shorter can also be filtered out, whereby to prevent the production of ozone in the vicinity of the liquid which is being treated. It will be apparent, therefore, that by modifying the filtering liquid or the characteristics of the cylinder 23 the emitted light may be modified correspondingly. The film of liquid which is maintained upon the inner wall of the cylinder 23 has the further advantage that it carries away the smoke and fine particles which are emitted by the arc, thereby protecting the glazed surface of the cylinder.

Means is provided for further cooling the cylinder 23. The said means includes a liquid supply pipe 29 having a terminal portion 30. The latter is formed to provide a circular loop which surrounds the cylinder 23. The said loop is suitably formed with an annular series of perforations through which a transparent cooling liquid is discharged against the outer wall of the cylinder 23. The perforations are preferably so formed that a liquid film is caused to flow over the entire outer wall. There is no need for controlling this film as to thickness or other characteristics as it does not have to function as a filtering medium. It is understood of course that the shell 25 and cylinder 23 are so arranged that an adequate space is maintained between the film of liquid which is being treated and the film of cooling liquid on the outer wall of the cylinder 23, in any case and equally if this additional means of cooling the said cylinder is availed of. The lower head 31 of the apparatus is formed or provided with concentric ribs 32 and 33, the former co-operating with the inner wall of the cylinder 23 to provide an annular chamber 34 in which the liquid flowing down the inner wall of the cylinder accumulates. The liquid may be withdrawn from the chamber 34 by a pipe 35. The rib 33 co-operates with the adjacent walls of the shell 25 and cylinder 23 to provide adjacent annular chambers 36 and 37. The cooling liquid which flows down the outer wall of the cylinder 23 accumulates in the former and is withdrawn through a pipe 38 while the liquid receiving the treatment accumulates in the chamber 37 and is withdrawn therefrom through a pipe 39. In other respects the apparatus is similar to and functions in substantially the same manner as the apparatus shown in Figure 1.

In the various embodiments illustrated the wall over which the liquid to be treated is caused to flow is cylindrical and vertical. It is to be understood, however, that such embodiments are for purposes of illustration and that the advantages of the invention may likewise be obtained in apparatus in which the wall over which the liquid to be treated is caused to flow is either planar or inclined with respect to the vertical. In each case, however, it is essential that the film of liquid have a free surface which is toward the source of light.

Heretofore in the treatment of liquids, milk being used as an example, it has been assumed that the innermost layer of milk, that is to say the layer farthest from the free surface and against the wall over which the liquid flows is the layer which receives the minimum light exposure or dose. It has, therefore, been the practice to regulate the light source and the film thickness in accordance with the dose necessary to destroy the bacteria in the innermost layer. I have discovered, however, that the layer receiving the minimum dose is a substantial distance away from the wall over which the liquid is flowing. In regulating the film thickness, therefore, in accordance with methods heretofore proposed a relatively large part of the milk has been over treated. It is this excessive treatment that imparts an objectionable taste to milk and at the same time destroys a large part of the vitamin A content. Such methods have the further objection that the cost of production is, in most cases, so high as to be impracticable. In other words, a poor product is obtained at a relatively high cost of production.

It will be apparent that the dose received by any particle in the liquid film in passing a unit distance in front of a light source is equal to the product of the intensity and the time required for the particle to move the unit distance. The viscous flow of a liquid against the wall 40 (Figure 12) with the liquid face a free surface is identically the same as the flow of the same liquid between the two parallel walls 41 and 42 (Figure 11), a distance apart twice the thickness of the liquid film. If a film of double thickness passes between the same parallel walls 41 and 42, the two layers on opposite sides but adjacent to the X axis will move with the same velocity, and hence one layer will not exert a viscous drag upon the other along their mutual interface which is along the line X. Thus, neither of the two films which constitute the total film thickness between the two walls is influenced by the presence or absence of the other. This fact is employed in determining the constants of integration following hereafter.

Figures 10, 11, 12, 13:
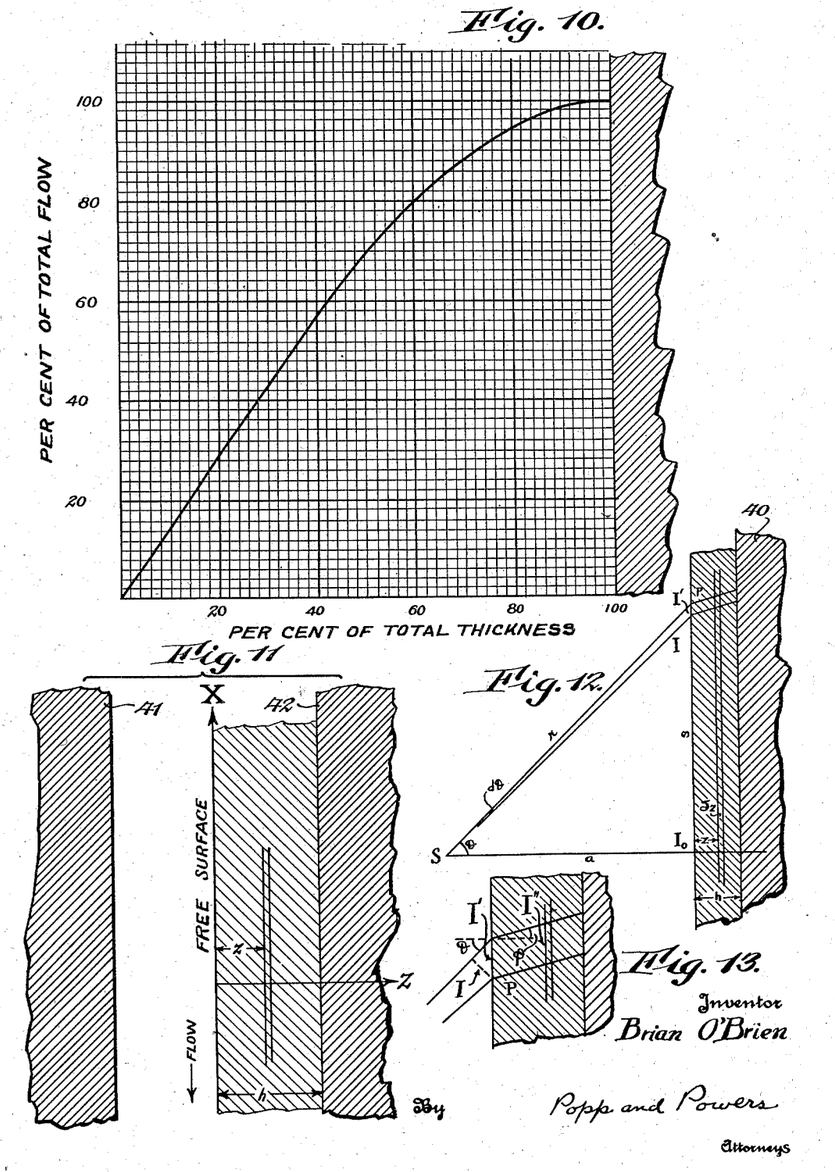
Figure 10 illustrates graphically the ratio of the flow of a liquid between the free surface of the film and a layer within the film to flow through the entire film.
Figures 11, 12 and 13, are diagrammatic views which are employed in illustrating the hydromechanical and optical relations which are involved.

Using the X and Z axes as shown in Figure 11, the pressure drop per unit distance in the X direction along a stratum normal to Z is equal to $$\frac{\partial p}{\partial x}$$

If $\mu \equiv$ coefficient of viscosity, the traction parallel to X in any plane normal to Z is $$\mu \frac{\partial v}{\partial z}$$

where $v \equiv$ velocity and the difference in tractions on the two faces of a stratum $\partial z$ is $$\mu \frac{\partial^2 v}{\partial z^2} \cdot \partial z$$

which is balanced by the force $$\frac{\partial p}{\partial x} \cdot \partial z$$

on the stratum.
So $$\mu \frac{\partial^2 v}{\partial z^2} = \frac{-\partial p}{\partial x}$$

where $$\frac{\partial p}{\partial x}$$

is a constant. Thus $$v = \frac{-1}{2\mu} z^2 \frac{\partial p}{\partial x} + Bz + A \quad (1)$$

But $v=0$ when $z=h$
So $$0 = \frac{-1}{2\mu} h^2 \frac{\partial p}{\partial x} + Bh + A$$

As shown above, the boundary conditions are the same as for parallel walls a distance of $2h$ apart. Thus $v=0$ when $z=-h$.
So $$0 = \frac{-1}{2\mu} h^2 \frac{\partial p}{\partial x} - Bh + A$$

Adding $$A = \frac{1}{2\mu} h^2 \frac{\partial p}{\partial x}, \quad B=0$$

So $$v = \frac{1}{2\mu} \frac{\partial p}{\partial x}(h^2 - z^2) \quad (3)$$

For a vertical surface, free $$\frac{\partial p}{\partial x} = \rho g$$

where $\rho \equiv$ density of liquid
and $g \equiv$ acceleration of gravity.

(It is to be noted that if the wall is inclined at an angle $\gamma$ with the vertical, $g$ is merely replaced by $g \cos \gamma$. This applies to liquid above or below the inclined surface so long as film conditions are such that uniform viscous flow occurs. It is also evident that in the event any additional forces, such as for example centrifugal force, are acting the resultant of all the forces acting simply replaces the force of gravity as appearing in these formulas.)

Thus $$v = \frac{\rho g}{2\mu}(h^2 - z^2) \quad (4)$$

and flow per unit time brought layers from $z=0$ to $z=z$ per unit width of film normal to plane of paper in Figure 11 is $$q_z = \int_0^z v \, dz = \frac{\rho g}{2\mu} \int_0^z (h^2 - z^2) dz = \frac{\rho g}{2\mu}\left[h^2 z - \frac{z^3}{3}\right] \quad (5)$$

and the total flow from $z=0$ to $z=h$ per unit width is $$q = \frac{\rho g}{2\mu}\left[h^3 - \frac{h^3}{3}\right] = \frac{\rho g h^3}{3\mu} \quad (6)$$

Dividing (5) by (6) gives the ratio of flow from the free surface $z=0$ to the layer $z=z$ to the flow through the whole film as $$F = \frac{q_z}{q} = \frac{3}{2h^3}\left(h^2 z - \frac{z^3}{3}\right) = \frac{1}{2}\left(3\frac{z}{h} - \frac{z^3}{h^3}\right)$$

If $$\frac{z}{h} = R$$

then $$F = \frac{1}{2}(3R - R^3) \quad (7)$$

which evidently is independent of the film thickness or the viscosity of the liquid.

Plotting (7) gives the curve shown in Figure 10.

The following physical constants of cows' milk 3½% fat (mixed herd) will be required for numerical computation and have been determined by standard methods, (all values are for a temperature of 20° C.):

Density, $\rho = 1.03$ gms./cm$^3$
Refractive index, $n = 1.38$ at wavelength 2850 A.
Coefficient of viscosity, $\mu = 0.015$ dyne sec./cm$^2$
Surface tension, $\sigma = 44.6$ dynes/cm. (ring method)
$\sigma = 42.5$ dynes/cm. (capillary tube rise method)

For comparison the constants for water are $\rho = 1.00$ gms/cm$^3$
$n = 1.36$ at wavelength 2850 A.
$\mu = 0.010$ dyne sec./cm$^2$
$\sigma = 71.0$ dynes/cm.

Thus for water $$v = 4.90 \times 10^4 (h^2 - z^2) \text{ cm/sec.}$$
$$q_z = 4.90 \times 10^4 \left(h^2 z - \frac{z^3}{3}\right) \text{ cm}^3/\text{sec.}$$
$$q = 3.27 \times 10^4 h^3 \text{ cm}^3/\text{sec.}$$

And for milk $$v = 3.27 \times 10^4 (h^2 - z^2) \text{ cm/sec.}$$
$$q_z = 3.27 \times 10^4 \left(h^2 z - \frac{z^3}{3}\right) \text{ cm}^3/\text{sec.}$$
$$q = 2.18 \times 10^4 h^3 \text{ cm}^3/\text{sec.}$$

$h$ and $z$ in cm.

The time required for a particle to pass down a unit distance at any layer is $$t = \frac{1}{v}$$

where $v$ is given by (4)

$$v = \frac{\rho g}{2\mu}(h^2 - z^2)$$

Figure 14:
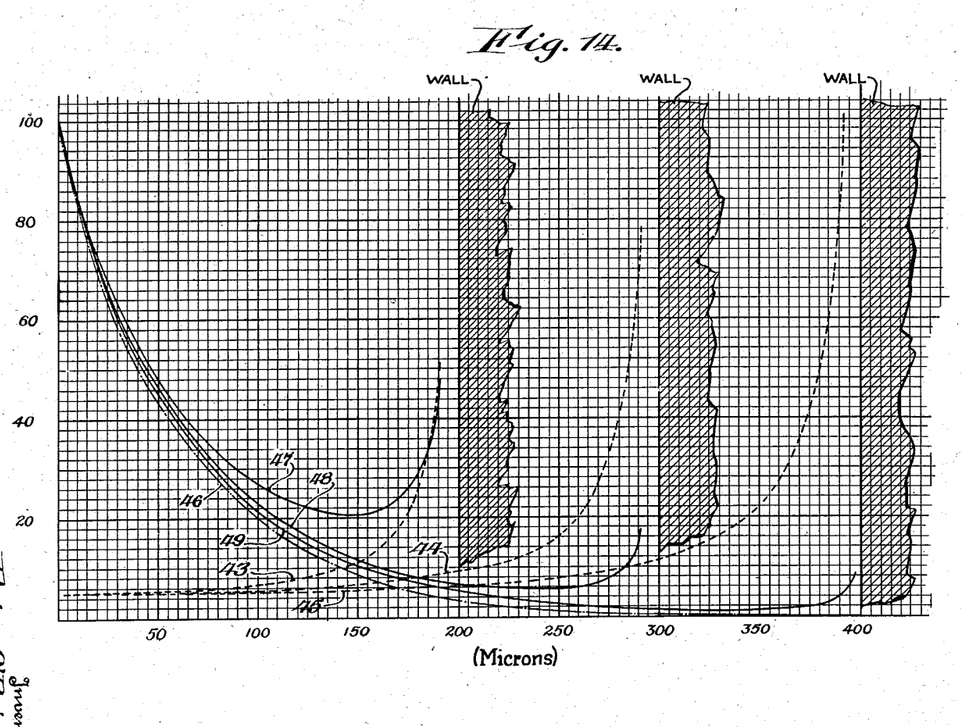
Figure 14 illustrates graphically, for three thicknesses of film, the time required for a particle at any layer to pass down a unit distance; the intensity of the light at any point any given distance in the liquid from the free surface of the film; and the dose a particle receives in passing down a unit distance opposite the light source at any given distance from the free surface of the film.

Plotting $1/v$ gives the curves 43, 44 and 45 of Figure 14 for three values of film thickness $h$ namely 200, 300 and 400 microns respectively. (For comparison the value of $1/v$ at the free surface of all three films is made the same. Actually $1/v$ at the surface of a film is $kh^2$, $k$=constant.) A number of direct measurements of velocity at the free surface, total quantity of liquid flowing and film thickness for a variety of flow conditions in milk and water confirm the above results in every case. The foregoing equations may, therefore, be used to predict values for all flows which are steady and non-turbulent.

From the curves 43, 44 and 45 it will be apparent that a film of liquid passing over a guiding surface moves in a manner somewhat similar to a pack of cards sliding across a surface, that is to say, the top card moving the fastest while the bottom card in contact with the surface remains at rest, the velocity of the intermediate cards increasing from the bottom card to the top card. In a like manner, the layer of liquid at the free surface of the film moves the fastest while the layer in contact with the wall is at rest, the intermediate layers increasing in speed from the innermost layer toward the surface layer. It is not possible to show that the layer of liquid in contact with the wall is absolutely at rest, for it appears that due to diffusion, it is not absolutely at rest. It can be shown, however, that it is very nearly at rest by experimentally determining the law relating the thickness of the film with the total quantity of liquid flowing in the film, and with the density and coefficient of viscosity of the liquid.

Where the thickness of film $h$ is very small compared to $r$, the distance from the source of light S to any point on the free surface (Figure 12)

$$n \sin \phi = \sin \theta$$

where $n$=the refractive index of the liquid for the wave length under consideration.

$$\sin \phi = \frac{\sin \theta}{n}$$

or $$\cos \phi = \sqrt{1 - \frac{\sin^2 \theta}{n^2}} = \frac{1}{n}\sqrt{n^2 - \sin^2 \theta}$$

If $I'$ (Figure 13)=intensity of light at any point in the free surface of the film (energy per unit area of film, not per unit area normal to direction of beam $r$), then the intensity on any lamina within the film whose plane is normal to the Z axis is $$I'' = I'\epsilon^{-\alpha\rho} = I'10^{-\beta\rho}$$

where $$\rho = \frac{z}{\cos \phi} = \frac{nz}{\sqrt{n^2 - \sin^2 \theta}}$$

so $$I'' = I'\epsilon^{\frac{-\alpha n z}{\sqrt{n^2-\sin^2\theta}}} = I'10^{\frac{-\beta n z}{\sqrt{n^2-\sin^2\theta}}}$$

From Figure 12

$$I = I_0 \frac{a^2}{r^2} = I_0 \cos^2 \theta$$

and from Figure 13 $I' = I \cos \theta = I_0 \cos^3 \theta$
so $$I'' = I_0 \cos^3 \theta \epsilon^{\frac{-\alpha n z}{\sqrt{n^2-\sin^2\theta}}} = I_0 \cos^3 \theta 10^{\frac{-\beta n z}{\sqrt{n^2-\sin^2\theta}}} \quad (8)$$

but $$\cos \theta = \frac{a}{r} = \frac{a}{\sqrt{a^2+s^2}}, \quad \sin \theta = \frac{s}{r} = \frac{s}{\sqrt{a^2+s^2}}$$

so $$I'' = \frac{a^3 I_0}{(a^2+s^2)^{\frac{3}{2}}} \epsilon^{\sqrt{n^2 - \frac{s^2}{a^2+s^2}}} = \frac{a^3 I_0}{(a^2+s^2)^{\frac{3}{2}}} \epsilon^{\frac{-\alpha n z \sqrt{a^2+s^2}}{\sqrt{s^2(n^2-1)+n^2 a^2}}}$$
$$= \frac{a^3 I_0}{(a^2+s^2)^{\frac{3}{2}}} 10^{\frac{-\beta n z \sqrt{a^2+s^2}}{\sqrt{s^2(n^2-1)+n^2 a^2}}} \quad (9)$$

when $\theta=0$, $s=0$ and $r=a$ (portion of film directly opposite the light source S).

$$I'' = I_0 \epsilon^{-\alpha z} = I_0 10^{-\beta z} \quad (10)$$

Figures 16, 17:
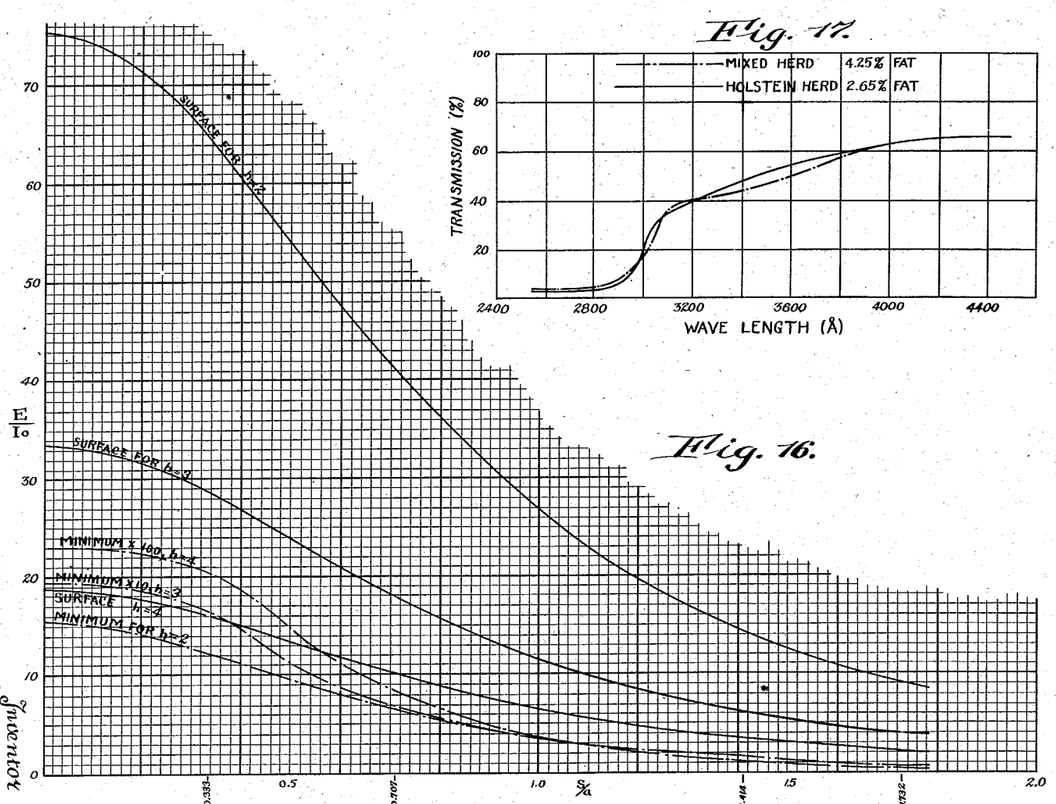
Figure 16 is a graphical illustration of the exposures along given paths and is available to determine the exposures along minimum paths as fractions of the exposures along the free surfaces.
Figure 17 illustrates the spectral transmission curves for two grades of cows' milk, the films being 0.20 mm. in thickness.

Plotting $I''$ against $z$ in (10) gives the curve 46 in Figure 14. The curve 46 gives the intensity at any point a distance $z$ from the free surface of the film in a direction horizontally out from the light source S. The value of $\alpha$ or $\beta$ in (10) is obtained from the transmission curve of Figure 17 by substituting the means transmission of two milk samples one 4.25% fat and the other 2.65% fat over the range 2800 A. to 2850 A. (4% transmission) in Equation (10) with $z=0.02$ cm.

Thus $\log 10 (0.04) = -0.02\beta$ or $\beta=70$ for $z$ in cm.

From the foregoing it will be apparent that in all liquids except those absolutely transparent, the light is most intense at the free surface and least intense at the wall, the light diminishing in intensity from the free surface toward the wall. Upon comparison of the time and intensity curves of Figure 14 it will also be apparent that while the surface layer of the film is subjected to a greater light intensity than an intermediate layer the latter is subjected to light over a greater period of time. Thus, there is some compensation.

The exposure or dose received by any particle is equal to the product of intensity and time. Thus, E (exposure)=$It$ where I=intensity and $t$=time. Or at any layer in the film $$E_1 = I''t_1 = \frac{I''}{v}$$

per unit distance in the direction of flow, since the time to flow a unit distance $$t_1 = \frac{1}{v}$$

Substituting the value $I''$ from (9) and $v$ from (4)

$$E_1 = \frac{2\mu a^2 I_0}{\rho g(h^2-z^2)} \cdot \frac{\epsilon^{\frac{-\alpha n z \sqrt{a^2+s^2}}{\sqrt{s^2(n^2-1)+n^2a^2}}}}{(a^2+s^2)^{\frac{1}{2}}} \quad (11)$$

and the dose in passing down from $s=+s$ to $s=-s$ at any layer a distance $z$ from the free surface is $$E = \int_{-s}^{+s} E_1 ds = 2\int_0^s E_1 ds =$$

$$\frac{4\mu a^2 I_0}{\rho g(h^2-z^2)} \int_0^s \frac{\epsilon^{\frac{-\alpha n z \sqrt{a^2+s^2}}{\sqrt{s^2(n^2-1)+n^2a^2}}}}{(a^2+s^2)^{\frac{1}{2}}} ds \quad (12)$$

Instead of integrating (12) directly (12) may be integrated mechanically by plotting $E_1$ against $s$ in (11) for any desired value of $z$ and the integral of $E_1 ds$ determined from the area under the curve of $E_1$ against $s$ between the desired limits for $s$
when $s=0$, $$E_1 = \frac{2\mu I_0 \, 10^{-\beta z}}{\rho g(h^2-z^2)} \quad (13)$$

Plotting $E_1$ against $z$ in (13) gives the curves 47, 48 and 49 of Figure 14 for values of $h$ of 0.02 cm., 0.03 cm. and 0.04 cm. respectively. It will be noted that the dose a particle receives in passing down a unit distance opposite the light source a distance $z$ in from the free surface of the film is a minimum for an intermediate value of $z$ and greater than this minimum for $z$ greater than $z_{min}$. This is likewise true for positions in the film not opposite the light source, as will be apparent from the following:

From (4) and (8), (11) may be written as $$\frac{E_1}{I_0} = \frac{10^{-\beta_s z}}{k_s(h^2-z^2)}$$

$$\frac{d}{dz}\left(\frac{E_1}{I_0}\right) = \frac{-2.30\beta_s 10^{-\beta_s z}}{k_s(h^2-z^2)} + \frac{2z 10^{-\beta_s z}}{k_s(h^2-z^2)^2} \quad (14)$$

which is zero at a minimum, or since $10^{-\beta_s z} \neq 0$ and since $h^2-z^2 \neq 0$ except at the wall surface of the film which cannot be a minimum from physical considerations.

$$2.30\beta_s - \frac{2z}{h^2-z^2} = 0$$

$$2.30\beta_s z^2 + 2z - 2.30\beta_s h^2 = 0$$

$$Z = \frac{-2 \pm \sqrt{4+21.2\beta h^2}}{4.60\beta_s} = -\frac{0.435}{\beta_s} \pm \sqrt{\frac{0.189}{\beta_s^2} + h^2}$$

Only the plus sign has a physical meaning so $$Z_{min} = \sqrt{h^2 + \frac{0.189}{\beta_s^2}} - \frac{0.435}{\beta_s} \quad (15)$$

where $$\beta_s z = \beta \rho = \beta z/\cos\varphi \text{ or } \beta_s = \beta/\cos\varphi$$

Figure 15:
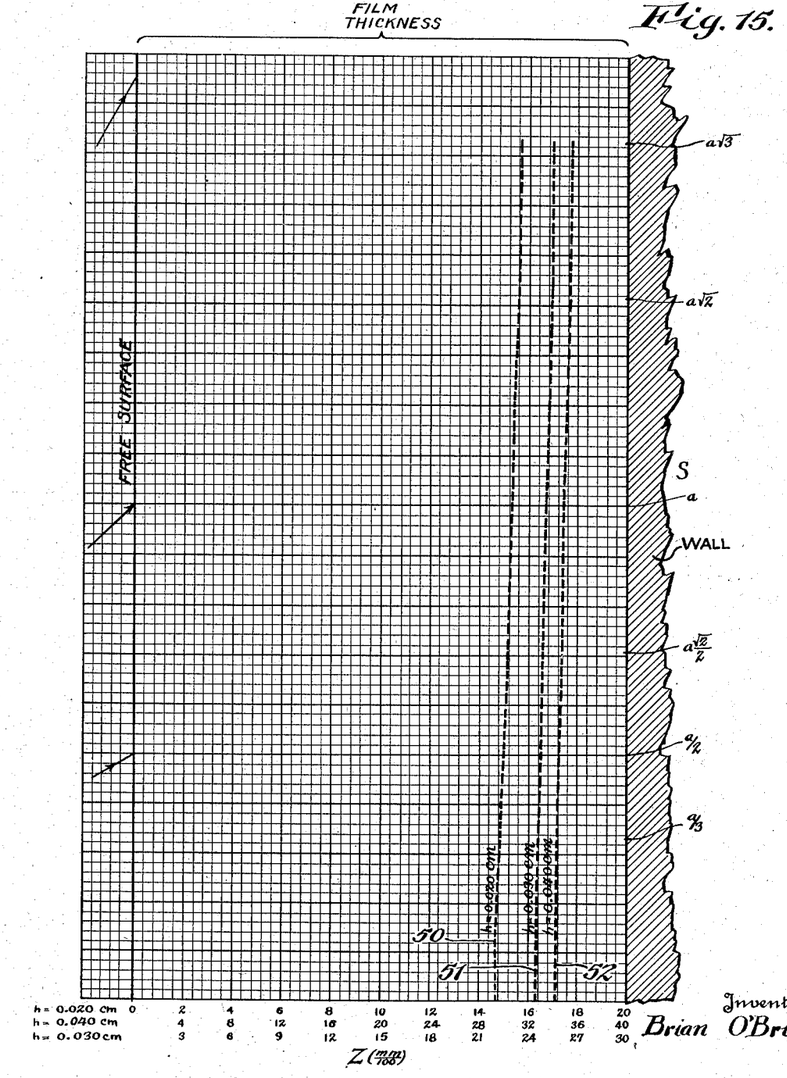
Figure 15 illustrates graphically, for three thicknesses of film, the path which a particle must travel in order to receive a minimum dose.

Computing (15) for values of $s$ from 0 to $a\sqrt{3}$ the values of $z$ minimum at different levels (values of $s$) are obtained for film thicknesses of 0.020 cm., 0.030 cm. and 0.040 cm. The dotted curves 50, 51 and 52 respectively (Figure 15) represent the paths which a particle must follow to receive the minimum exposure or dose, for each of the three film thicknesses. The above computation is made for cow's milk 3½% fat at a wave length of from 2800 A. to 2850 A. as before. If the flow is strictly parallel to the solid wall, no particle can follow such a path as shown. However, diffusion or slight instability in the film might cause an occasional particle to follow such a path, and since such a path represents the absolute minimum of exposure, it is important to know the exposure or dose along such a path compared to the exposure a particle travelling down the free surface receives. This is indicated graphically in Figure 16 by plotting $E_1/I_0$ against $s$ in (11) for the free surface path and the minimum exposure path for the three film thicknesses mentioned heretofore. The area under any one of these curves represents the exposure integrated along the path corresponding to the curve.

Total exposure, $$W = \int_{-s}^{s} \frac{E}{I_0} d\left(\frac{s}{a}\right) = \frac{2}{I_0 a}\int_0^s E\, ds$$

Area under curve for surface, $h=2=130.09n^2 \times 1$
Area under curve for minimum, $h=2= 22.38n^2 \times 1$ $\quad \frac{\text{minimum}}{\text{surface}} = 17.1\%$ Area under curve for surface, $h=3= 57.20n^2 \times 1$
Area under curve for minimum, $h=3= 26.03n^2 \times 1/10$ $\quad \frac{\text{minimum}}{\text{surface}} = 4.38\%$ Area under curve for surface, $h=4= 32.51n^2 \times 1$
Area under curve for minimum, $h=4= 31.45n^2 \times 1/100$ $\quad \frac{\text{minimum}}{\text{surface}} = 0.968\%$ Referring again to Figure 14 it will be noted that directly opposite the light source ($s=0$), when the intensity and the exposure per unit distance travelled are made 100% at the free surface, then the minimum intensity and minimum exposure per unit distance travelled are:

$h=0.020$ $I''$ min. 3.9%  $E_1$ min. 20.5%
$h=0.030$ $I''$ min. 0.80% $E_1$ min. 5.9%
$h=0.040$ $I''$ min. 0.16% $E_1$ min. 1.5%

Thus a considerable compensation occurs, the minimum exposure or dose being a much larger fraction of the surface exposure than the minimum intensity is of the intensity at the free surface. This compensation also occurs for values of $s$ other than zero. For example, where $$s = a\sqrt{3} \text{ and } h = 0.020 \text{ cm.,}$$

$I''$ minimum is 1.6% of the value at the surface while $E$ minimum is 11% of the value at the surface.

If the source of light is a line instead of a point, as, for example, a tube lamp whose axis is parallel to the X axis in Figure 11, then the dose received from each point on the line source of light by a particle passing through the flowing film at any layer is the same as the dose calculated from the foregoing. The total dose received by the particle from all points on the line source of light is simply the summation of the doses from each point on the source. If the distance along the X axis in the flowing film is appreciably greater than the length of the line source of light, then as a first approximation it is necessary only to replace $I_0$ in the foregoing calculations by $I_{01}$ where $I_{01}$ is the intensity at the free surface of the film due to a unit length of light source directly opposite. The dose so calculated is then multiplied by $L$, the length of the light source, to obtain the total dose for a particle received from the entire length of the light source.

The cases which have been so far considered have been those in which $\beta_s$ is large (the liquid very opaque). From (15) it will be evident that as $\beta_s$ becomes very large $z$ minimum approaches $h$, the layer receiving minimum dose is located nearly in contact with the guiding surface. When $\beta_s$ approaches 0 (the liquid being very transparent) (15) becomes indeterminate in its present form.

Equation (15) is, therefore, written as $z$ minimum $$= \sqrt{h^2 + \frac{c^2}{\beta_s^2}} - \frac{c}{\beta_s} \text{ where } c = 0.435$$

$$= \frac{c}{\beta_s}\sqrt{\frac{h^2\beta_s^2}{c^2}+1} - \frac{c}{\beta_s}$$

$$= \frac{c}{\beta_s}\left(\sqrt{1+\epsilon^2}-1\right) \text{ where } \epsilon = \frac{h\beta_s}{c}$$

$$= \frac{c}{\beta_s}(1-1+\tfrac{1}{2}\epsilon^2-\tfrac{1}{8}\epsilon^4+\ldots)$$

$$= \frac{c}{2\beta_s}(\epsilon^2-\tfrac{1}{4}\epsilon^4+\ldots) = \tfrac{1}{2}\left(\frac{h^2\beta_s}{c}-\tfrac{1}{4}\frac{h^4\beta_s^3}{c^3}+\ldots\right)$$

So limit $z$ minimum] $=0$
$\beta_s=0$

Thus for very small values of $\beta_s$, the layer of minimum dose lies almost at the free surface of the film, the dose increasing from the free surface inward to the solid wall. For $\beta_s=0$ (perfectly transparent liquid) the minimum dose is at the free surface.

It is to be noted that $I'$ and $I''$ (page 5) have been taken as the intensity at the free surface and at a point a distance $z$ in from the free surface measured in the plane of the film and not in a plane normal to the beam at any point. This gives the dose for a particle passing down any layer providing the particles are so close together that one particle is partly shaded by another particle in the same layer, or for a unit area in the plane of the layer traveling down the layer. If, however, the particles are so far apart that no such shading occurs, then in place of $I'$ and $I''$, $I_1'$ and $I_1''$ must be substituted which are, respectively, the intensity at the free surface and in a distance $z$ where the intensity is measured normal to the beam at the point and not normal to the plane of the film or layer of the film. Evidently $I_1'$ and $I_1''$ are always greater than $I'$ and $I''$ except where $\theta=0$ since $$I_1' = \frac{I'}{\cos\phi} \text{ and } I_1'' = \frac{I''}{\cos\phi}$$

where $n \sin\phi = \sin\theta$

The effect of this is to increase the absolute dose which a particle receives either when traveling down in the free surface, or when in traveling down some layer a distance $z$ in from the free surface. It does not effect the ratio of dose received in the free surface to that received in any other layer, however, so in no way effects the foregoing conclusions.

If desired the absolute amount of this increase for any case can be determined by substituting the value of $I_1'$ and $I_1''$ for $I'$ and $I''$ and proceeding as before. Evidently it is dependent only on the values of $s$ over which the integration is taken, and upon the refractive index $n$ of the liquid.

From the foregoing it will, therefore, be apparent that if a film of liquid is exposed to light and the liquid is not perfectly transparent, a particle flowing down within the film a short distance from the free surface, receives less exposure or light dose than a particle flowing down the free surface. A particle further from the free surface than the one just mentioned would receive a less exposure or dose and so on as particles at greater distances are selected until a layer is reached in which the particles receive a minimum dose. From this point on the dose increases as particles are selected at increased depths. For very transparent liquids, this minimum dose is close to the free surface, and for perfectly transparent liquids, the layer which receives the minimum dose lies at the free surface of the film. It is to be noted that this applies to film thicknesses small as compared to the distance from the film surface to the light source. When this is not the case, a slight modification in the expression for light intensity within the film is the only change necessary. The principles outlined in the foregoing still hold.

The importance of regulating the film thickness is apparent when it is considered that not only must the desired characteristics be imparted to the liquid without impairing certain of the characteristics thereof but the film must be treated at a rate which renders treatment in this manner practical from an economical standpoint. For example, in the killing of bacteria in milk, the same wave lengths which are chiefly effective in destroying bacteria also produce coagulation of certain proteins. Thus, assuming that the exposure necessary to produce coagulation of a protein particle (which may or may not be an individual molecule) is ten times the exposure necessary to kill a given bacterium, in order to destroy every bacterium passing down the film, it is necessary that the exposure at the layer receiving the minimum dose be sufficient for this purpose. Thus, for a film of milk 0.020 cm. thick the free surface will receive five times the bacteria killing dose or one-half the protein coagulation dose. For a film 0.020 cm. thick, the free surface will receive seventeen times the bacteria killing dose or one and seven-tenths times the protein coagulation dose, (see Figure 14). Under these conditions, therefore, the bacteria may be completely destroyed without definite protein coagulation in any part of the milk film for a film of 0.020 cm. thick but this would not be possible in a milk film of 0.030 cm. thick, as in the latter case all of the layers within 30 microns from the free surface would receive a dose higher than the protein coagulation dose. Referring to Figure 10, it will be noted that in this outer 30 microns of the 300 microns (0.030 cm.) of film, 15% of the total flow occurs, although it occurs in the outer 10% of film thickness only. Thus, protein coagulation would be produced in 15% of the milk. From this it is apparent that some film thickness greater than 0.020 cm. and less than 0.030 cm. could be selected so that the dose at the minimum dose layer would be one-tenth of the dose at the surface layer. Preferably the film, in the case of milk, is maintained at a thickness of the order of 0.029 cm. For such a film thickness, complete bacterial destruction can be effected throughout the film while the dose at the surface is insufficient to produce protein coagulation.

The thickness of the film is also important in connection with the problem of producing complete bacterial destruction without producing an antirachitic potency in the milk so great as to render the milk dangerous in large amounts, for example two quarts per person per day. If the antirachitic potency is such that two quarts per person per day is safe, only a small fraction of the available provitamin substance (inert ergosterol) need be activated to vitamin D. Under this condition it is immaterial, so far as vitamin D potency is concerned, whether all the milk is exposed or only a small fraction, for example, the surface layers, which are later mixed with the body of the milk. The bactericidal effect is not, however, dependent upon the dose received by the surface layer of the film as the bacteria passing down this layer will be killed in all events. It is the dose which is received at the layer of minimum dose which is important. While it is obvious that by making the film very thin a lethal dose can be imparted to all parts of the film regardless of the condition of flow, this would result in too great a dose for a part of the liquid treated and the apparatus would be operating below capacity. It is, therefore, important that the film thickness be regulated so that the minimum layer receives a lethal dose while the antirachitic vitamin production is maintained within safe limits. This is also important from a standpoint of economy as by doubling the film thickness the capacity of the apparatus is increased eight times (see equation 6). It is advantageous, therefore, that the film be regulated so that it is maintained at the maximum permissible thickness.

I claim as my invention:

1. The method of irradiating a liquid so that substantially all of the constituents receive at least a predetermined beneficial minimum dose without subjecting certain of the constituents to an excess exposure, which method consists in delivering the liquid to a guiding surface over which it is caused to flow in a continuous film having a free face in such a manner that the rate of travel of the constituents increases progressively from said surface toward said free face, subjecting the flowing film of liquid to a light source located opposite the free face of the film and having characteristics which enable it to produce light rays of predetermined wave lengths, whereby the path of minimum exposure is located a substantial distance from said guiding surface, the liquid being delivered to the guiding surface so that all of the constituents are caused to travel from one end of the treating zone to the other and controlling the delivery of the liquid to the guiding surface so that the thickness of the film is maintained substantially at the maximum permissible value as determined by the doses received by the constituents traveling in the film along the paths of minimum and maximum exposure, the dose received by the constituents traveling along said path of minimum exposure being a small percentage of the dose received by the constituents traveling along said free face.

2. The method of irradiating a liquid so that substantially all of the constituents receive at least a predetermined beneficial minimum dose without subjecting certain of the constituents to an excess exposure, which method consists in delivering the liquid to a guiding surface over which it is caused to flow in a continuous film having a free face in such a manner that the rate of travel of the constituents increases progressively from said surface toward said free face, interposing substantially transverse obstructions in the path of the liquid film to cause the latter to deviate abruptly and at predetermined intervals from the path provided by the guiding surface so as to prevent the formation of horizontally extending wave-like irregularities, the spacing of said obstructions being dependent upon the character of the liquid and the thickness of the film, subjecting the flowing film of liquid to a light source located opposite the free face of the film and having characteristics which enable it to produce light rays of predetermined wave lengths, whereby the path of minimum exposure is located a substantial distance from said guiding surface, the liquid being delivered to the guiding surface so that all of the constituents are caused to travel from one end of the treating zone to the other and controlling the delivery of the liquid to the guiding surface so that the thickness of the film is maintained substantially at the maximum permissible value as determined by the doses received by the constituents traveling in the film along the paths of minimum and maximum exposure, the dose received by the constituents traveling along said path of minimum exposure being a small percentage of the dose received by the constituents traveling along said free face.

3. The method of irradiating a liquid so that substantially all of the constituents receive at least a predetermined beneficial minimum dose without subjecting certain of the constituents to an excess exposure, which method consists in delivering the liquid to a roughened guiding surface of a grain fine as compared to the thickness of the film over which it is caused to flow in a continuous film having a free face in such a manner that the rate of travel of the constituents increases progressively from said surface toward said free face, subjecting the flowing film of liquid to a light source located opposite the free face of the film and having characteristics which enable it to produce light rays of predetermined wave lengths, whereby the path of minimum exposure is located a substantial distance from said guiding surface, the liquid being delivered to the guiding surface so that all of the constituents are caused to travel from one end of the treating zone to the other and controlling the delivery of the liquid to the guiding surface so that the thickness of the film is maintained substantially at the maximum permissible value as determined by the doses received by the constituents traveling in the film along the paths of minimum and maximum exposure, the dose received by the constituents traveling along said path of minimum exposure being a small percentage of the dose received by the constituents traveling along said free face.

4. The method of irradiating a liquid so that substantially all of the constituents receive at least a predetermined beneficial minimum dose without subjecting certain of the constituents to an excess exposure, which method consists in delivering the liquid to a guiding surface over which it is caused to flow in a thin continuous film having a free face in such a manner that the rate of travel of the constituents increases progressively from said surface toward said free face, subjecting the flowing film of liquid to a light source located opposite the free face of the film and having characteristics which enable it to produce light rays of predetermined wave lengths, whereby the path of minimum exposure is located a substantial distance from said guiding surface, the liquid being delivered to the guiding surface so that all of the constituents are caused to travel from one end of the treating zone to the other, maintaining said film at a substantially uniform overall temperature to maintain the stability of the film and controlling the delivery of the liquid to the guiding surface so that the thickness of the film is maintained substantially at the maximum permissible value as determined by the doses received by the constituents traveling in the film along the paths of minimum and maximum exposure, the dose received by the constituents traveling along said path of minimum exposure being a small percentage of the dose received by the constituents traveling along said free face.

5. The method of irradiating milk to subject substantially all of the constituents to an exposure adequate to destroy the bacteria while maintaining the production of the antirachitic vitamin within predetermined safe limits and without subjecting certain of the constituents to an excess exposure, which method consists in delivering the milk to a guiding surface over which it is caused to flow in a continuous film having a free face in such a manner that the rate of travel of the constituents increases progressively from said surface toward said free face, subjecting the flowing film of liquid to a source of ultra violet light located opposite the free face of the film and having characteristics which enable it to produce light rays of predetermined wave lengths, whereby the path of minimum exposure is located a substantial distance from said guiding surface, the liquid being delivered to the guiding surface so that all of the constituents are caused to travel from one end of the treating zone to the other and controlling the delivery of the liquid to the guiding surface so that the thickness of the film is maintained at some maximum permissible value less than .040 cm. as determined by the doses received by the constituents traveling in the film along the paths of minimum and maximum exposure, the dose received by the constituents traveling along said path of minimum exposure being a small percentage of the dose received by the constituents traveling along said free face.

6. The method of irradiating milk to subject substantially all of the constituents to an exposure adequate to destroy the bacteria while maintaining the production of the antirachitic vitamin within predetermined safe limits and without subjecting certain of the constituents to an excess exposure, which method consists in delivering the milk to a guiding surface over which it is caused to flow in a continuous film having a free face in such a manner that the rate of travel of the constituents increases progressively from said surface toward said free face, subjecting the flowing film of liquid to a source of ultra violet light located opposite the free face of the film and having characteristics which enable it to produce light rays of predetermined wave lengths, whereby the path of minimum exposure is located a substantial distance from said guiding surface, the liquid being delivered to the guiding surface so that all of the constituents are caused to travel from one end of the treating zone to the other and controlling the delivery of the liquid to the guiding surface so that the thickness of the film is maintained at a value of the order of .029 cm. as determined by the doses received by the constituents traveling in the film along the paths of minimum and maximum exposure, the dose received by the constituents traveling along said path of minimum exposure being a small percentage of the dose received by the constituents traveling along said free face.

7. The method of irradiating milk to subject substantially all of the constituents to an exposure adequate to destroy the bacteria while maintaining the production of the antirachitic vitamin within predetermined safe limits and without subjecting certain of the constituents to an excess exposure, which method consists in delivering the milk to a guiding surface over which it is caused to flow in a continuous film having a free face in such a manner that the rate of travel of the constituents increases progressively from said surface toward said free face, subjecting the flowing film of liquid to light rays from a light source located opposite the free face of the film and of wave lengths of from substantially 2750 Angstrom units to substantially 3150 Angstrom units without subjecting it to any substantial intensity of rays of wave lengths less than 2750 Angstrom units, whereby the path of minimum exposure is located a substantial distance from said guiding surface, the liquid being delivered to the guiding surface so that all of the constituents are caused to travel from one end of the treating zone to the other and controlling the delivery of the liquid to the guiding surface so that the thickness of the film is maintained substantially at the maximum permissible value as determined by the doses received by the constituents traveling in the film along the paths of minimum and maximum exposure, the dose received by the constituents traveling along said path of minimum exposure being a small percentage of the dose received by the constituents traveling along said free face.

8. The method of irradiating milk to subject substantially all of the constituents to an exposure adequate to destroy the bacteria while maintaining the production of the antirachitic vitamin within predetermined safe limits and without subjecting certain of the constituents to an excess exposure, which method consists in delivering the milk to a guiding surface over which it is caused to flow in a continuous film having a free face in such a manner that the rate of travel of the constituents increases progressively from said surface toward said free face, subjecting the flowing film of liquid to light rays from a light source located opposite the free face of the film and of wave lengths of from substantially 2750 Angstrom units to substantially 3150 Angstrom units without subjecting it to any substantial intensity of rays of wave lengths less than 2750 Angstrom units, whereby the path of minimum exposure is located a substantial distance from said guiding surface, the liquid being delivered to the guiding surface so that all of the constituents are caused to travel from one end of the treating zone to the other and controlling the delivery of the liquid to the guiding surface so that the thickness of the film is maintained at some maximum permissible value less than .040 cm. as determined by the doses received by the constituents travelling in the film along the paths of minimum and maximum exposure, the dose received by the constituents traveling along said path of minimum exposure being a small percentage of the dose received by the constituents traveling along said free face.

9. The method of irradiating milk to subject substantially all of the constituents to an exposure adequate to destroy the bacteria while maintaining the production of the antirachitic vitamin within predetermined safe limits and without subjecting certain of the constituents to an excess exposure, which method consists in delivering the milk to a guiding surface over which it is caused to flow in a continuous film having a free face in such a manner that the rate of travel of the constituents increases progressively from said surface toward said free face, subjecting the flowing film of liquid to a source of ultra violet light located opposite the free face of the film and having characteristics which enable it to produce light rays of predetermined wave lengths, whereby the path of minimum exposure is located a substantial distance from said guiding surface, filtering out those ultra violet rays of a wave length of the order of 2200 Angstrom units and less whereby to prevent the production of ozone in the vicinity of the liquid, the liquid being delivered to the guiding surface so that all of the constituents are caused to travel from one end of the treating zone to the other and controlling the delivery of the liquid to the guiding surface so that the thickness of the film is maintained substantially at the maximum permissible value as determined by the doses received by the constituents traveling in the film along the paths of minimum and maximum exposure, the dose received by the constituents traveling along said path of minimum exposure being a small percentage of the dose received by the constituents traveling along said free face.

10. The method of irradiating milk to subject substantially all of the constituents to an exposure adequate to destroy the bacteria while maintaining the production of the antirachitic vitamin within predetermined safe limits and without subjecting certain of the constituents to an excessive exposure, which method consists in delivering the milk to a guiding surface over which it is caused to flow in a continuous film having a free face in such a manner that the rate of travel of the constituents increases progressively from said surface toward said free face, subjecting the flowing film of liquid to light rays from a light source located opposite the free face of the film and of wave lengths of from substantially 2750 Angstrom units to substantially 3150 Angstrom units without subjecting it to any substantial intensity of rays of wave lengths less than 2750 Angstrom units, whereby the path of minimum exposure is located a substantial distance from said guiding surface, filtering out light rays of wave lengths of the order of 2200 Angstrom units and less whereby to prevent the production of ozone in the vicinity of the liquid, the liquid being delivered to the guiding surface so that all of the constituents are caused to travel from one end of the treating zone to the other and controlling the delivery of the liquid to the guiding surface so that the thickness of the film is maintained substantially at the maximum permissible value as determined by the doses received by the constituents traveling in the film along the paths of minimum and maximum exposure, the dose received by the constituents traveling along said path of minimum exposure, being a small percentage of the dose received by the constituents traveling along said free face.

11. The method of irradiating milk to subject substantially all of the constituents to an exposure adequate to destroy the bacteria while maintaining the production of the antirachitic vitamin within predetermined safe limits and without subjecting certain of the constituents to an excess exposure, which method consists in delivering the milk to a guiding surface over which it is caused to flow in a continuous film having a free face in such a manner that the rate of travel of the constituents increases progressively from said surface toward said free face, subjecting the flowing film of liquid to light rays from a light source located opposite the free face of the film and of wave lengths of from substantially 2750 Angstrom units to substantially 3150 Angstrom units without subjecting it to any substantial intensity of rays of wave lengths less than 2750 Angstrom units, whereby the path of minimum exposure in said film is located a substantial distance from said guiding surface, filtering out light rays from said source of wave lengths of the order of 2200 Angstrom units and less so as to prevent the production of ozone in the vicinity of the liquid, the liquid being delivered to the guiding surface so that all of the constituents are caused to travel from one end of the treating zone to the other and controlling delivery of the liquid to the guiding surface so that the thickness of the film is maintained at some maximum permissible value less than .040 cm. as determined by the doses received by the constituents traveling in the film along the paths of minimum and maximum exposure, the dose received by the constituents traveling along said path of minimum exposure being a small percentage of the dose received by the constituents traveling along said free face.

12. The method of irradiating milk to subject substantially all of the constituents to an exposure adequate to destroy the bacteria while maintaining the production of the antirachitic vitamin within predetermined safe limits and without subjecting certain of the constituents to an excess exposure, which method consists in delivering the milk to a guiding surface over which it is caused to flow in a continuous film having a free face in such a manner that the rate of travel of the constituents increases progressively from said surface toward said free face, subjecting the flowing film of liquid to light rays from a light source located opposite the free face of the film and of wave lengths of from substantially 2750 Angstrom units to substantially 3150 Angstrom units without subjecting it to any substantial intensity of rays of wave lengths less than 2750 Angstrom units, whereby the path of minimum exposure is located a substantial distance from said guiding surface, the liquid being delivered to the guiding surface so that all of the constituents are caused to travel from one end of the treating zone to the other, cooling the guiding surface to counteract the heating effect of the light source so as to maintain the stability of the film and controlling the delivery of the liquid to the guiding surface so that the thickness of the film is maintained at some maximum permissible value less than .040 cm. as determined by the doses received by the constituents traveling in the film along the paths of minimum and maximum exposure, the dose received by the constituents traveling along said path of minimum exposure being a small percentage of the dose received by the constituents traveling along said free face.

13. The method of irradiating a liquid so that substantially all of the constituents receive at least a predetermined beneficial minimum dose without subjecting certain of the constituents to an excess exposure, which method consists in delivering the liquid to a guiding surface over which it is caused to flow in a continuous film having a free face in such a manner that the rate of travel of the constituents increases progressively from said surface toward said free face, subjecting the flowing film of liquid to a light source located opposite the free face of the film and having characteristics which enable it to produce light rays of predetermined wave lengths, whereby the path of minimum exposure is located a substantial distance from said guiding surface, the liquid being delivered to the guiding surface so that all of the constituents are caused to travel from one end of the treating zone to the other and controlling the delivery of the liquid to the guiding surface so that the thickness of the film is maintained substantially at the maximum permissible value as determined by the doses received by the constituents traveling in the film along the paths of minimum and maximum exposure, the dose received by the constituents traveling along said path of minimum exposure being a small percentage, more particularly 1.5%–20.5%, of the dose received by the constituents traveling along said free face.

14. Method of irradiating liquid milk which comprises passing the milk in a film over a surface, the opposite surface of the film being unconfined; and impinging ultra-violet energy on said film while maintaining the film at a thickness of 0.2 mm.

BRIAN O'BRIEN.